United States Patent

[11] 3,572,885

| [72] | Inventors | Gunter Reinheimer<br>Amberg;<br>Walter Klein, Auf der Hohl, Germany |
|---|---|---|
| [21] | Appl. No. | 638,282 |
| [22] | Filed | May 15, 1967 |
| [45] | Patented | Mar. 30, 1971 |
| [73] | Assignee | Ernst Leitz G. m. b. H., Optische Werke<br>Wetzlar, Germany |
| [32] | Priority | July 16, 1966 |
| [33] | | Germany |
| [31] | | L54089 |

[54] POLARIZING MICROSCOPE HAVING BERTRAND LENS
3 Claims, 4 Drawing Figs.

[52] U.S. Cl. .................................................. 350/14,
350/15, 350/159
[51] Int. Cl. ...................................................... G02b 27/28
[50] Field of Search .......................................... 350/17, 45,
54, 156, 37.38; 240/(Inquired); 350/12—15, 157,
159

[56]  References Cited
UNITED STATES PATENTS

| 1,498,159 | 6/1924 | Ehringhaus .................. | 350/14 |
|---|---|---|---|
| 2,963,942 | 12/1960 | DeMontremy ............... | 350/45X |
| 3,259,039 | 7/1966 | Okajima ...................... | 350/54 |
| 3,401,233 | 9/1968 | Hellings ....................... | 350/45X |
| 2,207,124 | 7/1940 | Kollmorgen .................. | 350/54X |
| 1,527,848 | 2/1925 | Ehringhaus .................. | 350/14X |

OTHER REFERENCES
Wright, " A New Petrographic Microscope" American Journal of Science; Vol. XXIX, 3rd Series, 1910 pp. 408—412

*Primary Examiner*—David Schonberg
*Assistant Examiner*—Paul R. Miller
*Attorney*—Otto John Munz ABSTRACT: In a polarizing microscope having conoscopic and orthoscopic viewing modes a Bertrand lens for conoscopic observation is employed. A diaphragm is arranged close to said Bertrand lens, and in addition to the Bertrand lens a further lens is insertable in the path of the light rays. The focal length of this lens is calculated as to produce — in combination with the microscope objective — an image of the object in the plane of the diaphragm located adjacent said Bertrand lens. It has proven particularly useful to insert said additional lens as close to the image-side focal plane of the objective as possible. During orthoscopic viewing the Bertrand lens, diaphragm, and additional lens are removed from the optical path of the microscope.

PATENTED MAR 30 1971 3,572,885
Fig. 1 PRIOR ART
Fig. 2 PRIOR ART
Fig. 3 PRIOR ART
Fig. 4
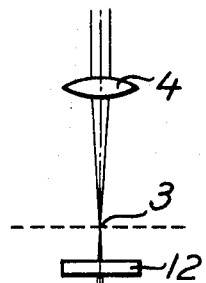
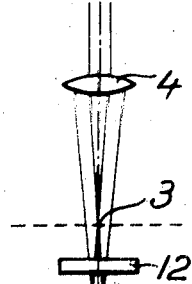
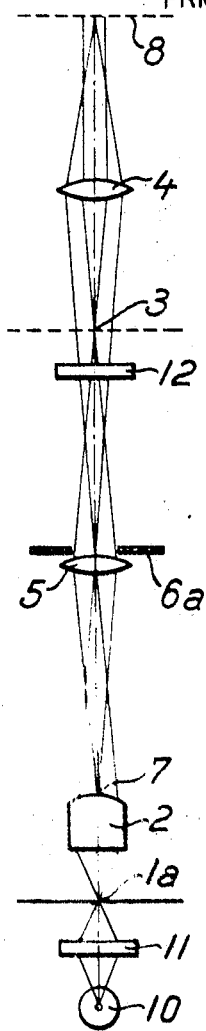
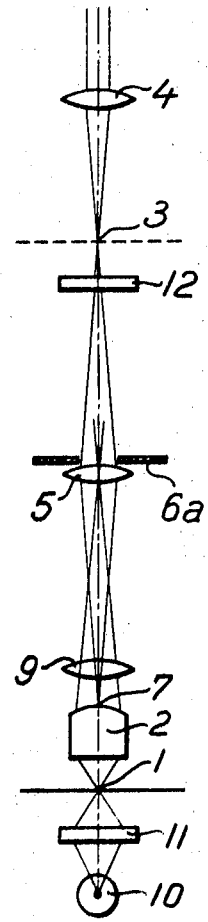
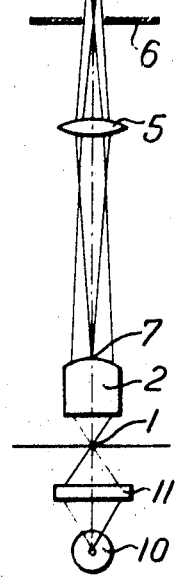
INVENTOR
GÜNTER REINHEIMER & WALTER KLEIN
BY
Otto John Munz
ATTORNEY

POLARIZING MICROSCOPE HAVING BERTRAND LENS

BACKGROUND OF THE INVENTION

1. Field of the Invention

Our present invention relates to polarizing microscopes. More specifically, our invention relates to polarizing microscopes being equipped with a Bertrand lens.

2. Description of the Prior Art

While working with polarizing microscopes it is desirable—besides being able to perform the ordinary object observation, the so called "orthoscopic" observation—also to be in a position to observe the exit pupil of the objective. This type of observation is termed "conoscopic" observation and is performed by removably positioning a Bertrand lens into the path of the light rays between objective and ocular. By this Bertrand lens an image of the exit pupil of the objective is produced in that plane in which during orthoscopic observation the image of the object appears. Of course, the formation of the object-image is influenced by the Bertrand lens, resulting in that object-image now being formed at a greater distance from the ocular.

During conoscopic observation it is in many cases desirable to have the conoscopic image produced only by such light rays which pass through a certain object particle. It is, therefore, common practice with polarizing microscopes to removably insert an iris diaphragm in the plane in which, after inserting the Bertrand lens, the object-image is produced, and to cover said object-image by means of said diaphragm except for that particular particle. In applying this method, however, two problems are encountered:

a. Since the apertures of the Bertrand lenses are usually very small, the depth of focus is so great that the formation of the conoscopic image is disturbed due to the fact that both image planes are located relatively close by each other.

b. Especially in microscopes having binocular tubes there is not sufficient space in the plane of the orthoscopic object-image for disposing a diaphragm as a result of which the image cannot be covered to the required extent.

Therefore it has already been suggested to arrange the iris diaphragm immediately adjacent the Bertrand lens, as described and illustrated in U.S. Pat. No. 1,498,159 to Ehringhaus. This requires, of course, that the orthoscopic object-image be produced in this same plane. The image formation, however, is only possible by varying the object distance according to the specific magnification of the objective in use. In consequence thereof, the object has to be vertically displaced along the optical axis. Now, with the object image being produced in the plane of the diaphragm it is no longer possible to observe said object-image by means of the ocular. A second image of the object is, however, produced by the ocular, and if observation of the object-image is desired, an auxiliary lens has to be employed which may also serve to simultaneously observe the diaphragm. This solution of the existing problem is rather complicated and therefore not much favored by the users.

SUMMARY OF THE INVENTION

It is, therefore, an object of our invention to eliminate the above-mentioned disadvantages. In this we succeed by disposing the diaphragm immediately adjacent the Bertrand lens as was also hitherto known in the art, and by inserting a further lens together with the Bertrand lens into the path of the light rays. The focal length of said lens being calculated to produce an image of the object from the same object distance in the plane of the diaphragm. It is advantageous to arrange the additional lens as close to the image-side focal planes of the objectives as possible. In this position, the additional lens has only little effect on the formation of the conoscopic image. The Bertrand lens, diaphragm, and additional lens are simultaneously positioned in the optical path of the microscope during conoscopic viewing. These three elements are removed during orthoscopic viewing. The advantage of using the additional lens during conoscopic viewing is that the object being observed remains in focus when the microscope is changed from the orthoscopic to conoscopic mode.

BRIEF DESCRIPTION OF THE DRAWINGS

The invention can best be explained with reference to the accompanying drawings, wherein:

FIG. 1 shows schematically the path of the image forming light rays in a standard polarizing microscope of the prior art for orthoscopic viewing;

FIG. 2 shows schematically the path of a image forming light rays of a prior art arrangement with a Bertrand lens and a diaphragm inserted in the optical path for conoscopic viewing;

FIG. 3 shows schematically the path of the image forming light rays of a prior art arrangement with a Bertrand lens inserted and with a diaphragm immediately adjacent said lens for conoscopic viewing;

FIG. 4 shows schematically the path of the image forming light rays in a device according to our invention during conoscopic viewing.

DESCRIPTION OF THE PREFERRED EMBODIMENT

All FIGS. show in the substage area a light source 10 and a polarizer 11. Above the stage on which the objects 1, 1a are placed the objective 2, the analyzer 12 and the ocular 4 are located. These elements together constitute schematically a polarizing microscope.

In FIG. 1 an (orthoscopic) image of the object 1 is produced by the objective 2 in the intermediate-image plane 3, said image can be observed by means of the ocular 4. This represents the structure of a polarizing microscope during an orthoscopic mode. By inserting the Bertrand lens 5 into the path of the light rays as illustrated in FIG. 2, the microscope is converted to a conoscopic mode and the orthoscopic image of the object 1 is now caused to be formed in the plane 6, whereas the conoscopic image of the exit pupil 7 of the objective 2 is produced in the intermediate-image plane 3. Thus, it is now the conoscopic image (an image of the exit pupil 7) which is observable by means of the ocular 4.

As illustrated in FIG. 3, in the conoscopic mode immediately adjacent the Bertrand lens 5 an iris diaphragm 6a for the observation of an object particle is located. Again the (conoscopic) image of the exit pupil 7 is formed in the intermediate-image plane 3 and may be observed by means of the ocular 4. The (orthoscopic) image of the object 1a is shown to appear in the plane of the diaphragm 6a. This, however, is only possible by enlarging the distance between the object 1a and the objective 2 (refocusing). An image of the diaphragm 6a together with the orthoscopic image is produced in the plane 8 by the ocular 4. These images may be observed by means of an additional magnifying lens (not shown).

In the FIGS. 1—3 embodiments are illustrated as known in the prior art, FIG. 4, however, shows a device according to our invention which uses the structure and functions of the elements shown in FIG. 3.

In FIG. 4, an image of the object 1 is produced by means of the objective 2 and the additional lens 9 in the plane of the diaphragm 6a which is again located immediately adjacent the Bertrand lens 5. It should particularly be noted that the insertion of the additional lens 9 according to our invention eliminates any necessity of vertically displacing the object (refocusing), since the focal length of lens 9 is calculated—into account the focal length of the objective—as to always produce the object image in the plane of said diaphragm 6a.

The (conoscopic) image of the exit pupil 7 is, as before, produced in the intermediate-image plane 3 and may be observed through the ocular 4. The formation of the image of the exit pupil 7 is practically not influenced by the additional lens 9. Of course, as in the prior art, the Bertrand lens and diaphragm are removed during orthoscopic viewing. However, with the present invention, the additional lens 9 is also removed during orthoscopic viewing. These three elements are all inserted during conoscopic viewing.

We claim:
1. A polarizing microscope operable in conoscopic and orthoscopic modes comprising in combination:
a source of light;
a polarizer for directing the polarized light rays along a predetermined path to an object plane;
an objective means in optical alignment along a common optical axis for focusing said polarized light rays coming from said object plane for producing an image;
an ocular means in said path for observation of the image;
a Bertrand lens insertable in said path between said objective and ocular means;
a diaphragm means disposed in said path and insertable with said Bertrand lens, the diaphragm means being physically adjacent thereto;
the diaphragm means and Bertrand lens being insertable during said conoscopic mode;
an analyzer disposed in said path of the focused light between said ocular means and said Bertrand lens for controlling the polarized light transmitted toward said ocular means;
an additional lens means insertable in said path between said objective and Bertrand lens during said conoscopic mode;
the focal length of said additional lens means selected to produce an image of the object in the plane of said diaphragm means, whereby the object remains in focus between the orthoscopic and conoscopic modes.

2. A polarizing microscope according to claim 1, in which said additional lens is disposed as close to the image said focal plane of said objective means as possible.

3. A polarizing microscope according to claim 1 in which said diaphragm means consists of an iris diaphragm.